US008149319B2

(12) United States Patent
Robinson

(10) Patent No.: US 8,149,319 B2
(45) Date of Patent: Apr. 3, 2012

(54) END-TO-END DESIGN OF ELECTRO-OPTIC IMAGING SYSTEMS FOR COLOR-CORRELATED OBJECTS

(75) Inventor: M. Dirk Robinson, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 1063 days.

(21) Appl. No.: 11/999,101

(22) Filed: Dec. 3, 2007

(65) Prior Publication Data

US 2009/0141140 A1 Jun. 4, 2009

(51) Int. Cl.
G02B 13/16 (2006.01)
G02B 27/10 (2006.01)
G02B 3/00 (2006.01)
H04N 5/225 (2006.01)
H04N 5/228 (2006.01)
H04N 5/235 (2006.01)
H04N 9/07 (2006.01)

(52) U.S. Cl. .......... 348/335; 348/218.1; 348/222.1; 348/229.1; 348/266; 359/618; 359/642

(58) Field of Classification Search .......... 348/218.1, 348/222.1, 229.1, 262–283, 335, 340; 396/72–128; 359/362–435, 618–640, 642–693, 707–797
See application file for complete search history.

(56) References Cited

U.S. PATENT DOCUMENTS

| 4,929,071 A * | 5/1990 | Mercado | 359/648 |
|---|---|---|---|
| 4,950,041 A * | 8/1990 | Robb | 359/665 |
| 5,033,831 A * | 7/1991 | Sigler | 359/665 |
| 5,468,950 A | 11/1995 | Hanson | |
| 5,748,371 A | 5/1998 | Cathey, Jr. et al. | |
| 7,224,540 B2 | 5/2007 | Olmstead et al. | |
| 7,248,716 B2 * | 7/2007 | Fein et al. | 382/100 |
| 2006/0239549 A1 | 10/2006 | Kelly et al. | |
| 2006/0262313 A1 * | 11/2006 | Bahatt et al. | 356/445 |
| 2007/0057211 A1 * | 3/2007 | Bahlman et al. | 250/584 |
| 2008/0129974 A1 * | 6/2008 | Asaishi | 355/67 |

FOREIGN PATENT DOCUMENTS

| FR | 2880958 A1 | 7/2006 |
|---|---|---|
| JP | 06 113309 A | 4/1994 |
| JP | 2000 338385 A | 12/2000 |

OTHER PUBLICATIONS

European Partial Search Report, European Application No. 08170572.5, Mar. 4, 2009, 4 pages.
Fales, C.L. et al., "Imaging System Design for Improved Information Capacity," Applied Optics, Mar. 15, 1984, pp. 872-888, vol. 23, No. 6.

* cited by examiner

*Primary Examiner* — Jason Chan
*Assistant Examiner* — Michael Osinski
(74) *Attorney, Agent, or Firm* — Fenwick & West LLP

(57) ABSTRACT

An electro-optic color imaging system includes an optical subsystem, a detector subsystem and a digital image processing subsystem. The system is used to image a color-correlated object. In the optical subsystem, the image surfaces for different color channels of the object are substantially separated. Thus, one color channel may be in focus while others are out of focus. The detector subsystem is located at a fixed image distance from the optical subsystem and captures the different color channel images of the object. The image processing subsystem estimates the image of the object by combining the captured color channel images based at least in part on an a priori estimate of the correlation between the color channels.

25 Claims, 14 Drawing Sheets
(1 of 14 Drawing Sheet(s) Filed in Color)

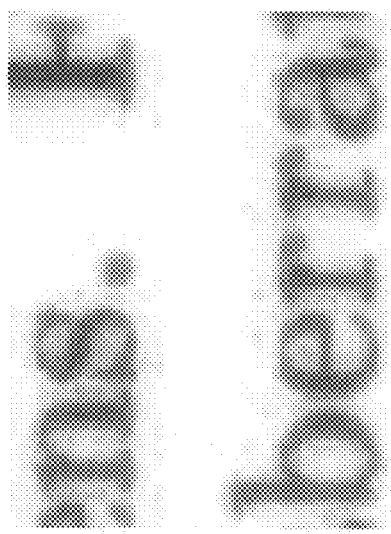
Figure 7a
Figure 7b
Figure 8a
Figure 8b Figure 10a          Figure 10b

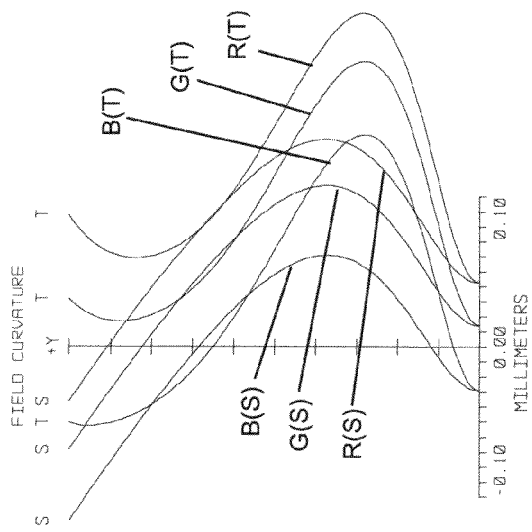
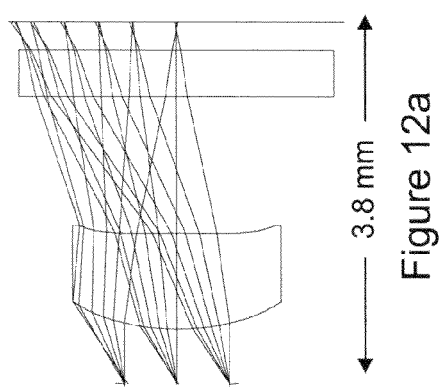
Figure 12a
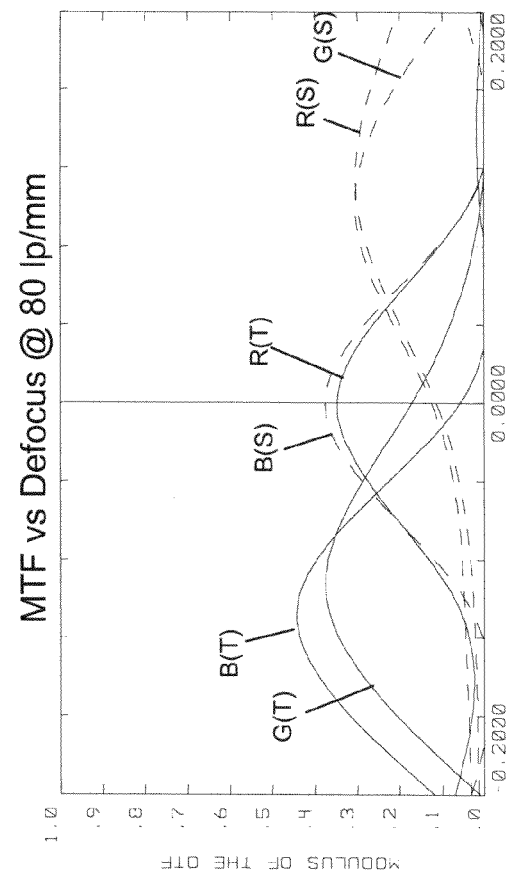
Figure 12c
Figure 12b

END-TO-END DESIGN OF ELECTRO-OPTIC IMAGING SYSTEMS FOR COLOR-CORRELATED OBJECTS

BACKGROUND OF THE INVENTION

1. Field of the Invention

This invention relates generally to the design of electro-optic imaging systems, and more particularly, to the "end-to-end" design of systems used to image objects in which different color channels of the object are correlated.

2. Description of the Related Art

Electro-optic imaging systems typically include an optical subsystem (e.g., a lens assembly), an electronic detector subsystem (e.g., CCD detector array) and a digital image processing subsystem (e.g., typically implemented in dedicated chips or software). Traditional methods for designing these systems generally involve two discrete stages. First, the optical subsystem is designed with the goal of forming a high quality intermediate optical image of the source (subject to cost, physical and other non-imaging constraints). Next, after the optical subsystem has been designed, the digital image processing subsystem is designed to compensate for remaining defects in the sampled intermediate optical image.

In many imaging applications, the objects of interest have many spectral components. Traditionally, the optical designer optimizes the lens design parameters to minimize a variety of optical aberrations so as to produce a high quality optical image at a single image plane. Applications involving imaging of spectrally broad sources require that these aberrations be minimized over a range of wavelengths dependent on the spectral sensitivity of the detector subsystem. In such applications, the dispersion found in optical glasses and plastics makes it difficult to focus all wavelengths at the same point. Without correction, the location of the "in-focus" image plane will vary for different color bands or "channels." The image for the red channel might be in focus at one location, the image for the green channel at another location and the blue channel image at yet a third location. Conversely, positioning the detector array at one fixed location means that one color channel may be in focus while the others are out of focus. This variation of best focus with wavelength is known as axial chromatic aberration.

The standard practice to minimize axial chromatic aberrations involves choosing lens materials with suitable dispersions to balance the aberrations. For example, the first and third lens elements (positively powered elements) in a triplet lens system often have very high Abbe numbers (Crown glasses) to minimize positive axial chromatic aberration. The second negative lens element is constructed with a low Abbe number glass material (Flint glasses) so as to impart strong negative chromatic aberration balancing the positive chromatic aberrations of the first and third lens elements. The traditional approach attempts to bring all color channels into sharp focus at the same image distance. However, the resulting lens designs can be relatively complex and expensive.

U.S. Pat. No. 5,748,371 to Cathey, Jr. et al. describes a different approach. A phase mask is introduced in the optical subsystem so that the aggregate modulation transfer function (MTF) averaged over all color channels is relatively insensitive to shifts in the image plane. Instead of being "sharply in focus" at one location and then degrading fairly rapidly to "extremely out of focus" as the image plane is shifted away from the optimal image distance, the optical subsystem in Cathey is designed so that it is "moderately out of focus" over an extended range of image plane positions. That is, the full color image is always somewhat blurry but does not get significantly better or worse as the location of the image plane changes. This effect is used to extend the depth of focus of the overall system. However, one major drawback is that the image is always somewhat blurry. In other words, the MTF suffers from low contrast.

U.S. Pat. No. 7,224,540 to Olmstead et al. and U.S. Pat. No. 5,468,950 to Hanson describe a different approach. In these examples, the objects are limited to the special class in which the images for all color channels are the same. That is, the red channel image must be the same as the green channel image, must be the same as the blue channel image. Both patents concentrate specifically on the imaging of black and white bar codes. For this special case, the black and red bar code (i.e., the image of the black and white bar code in the red color channel) is the same as the black and green bar code, is the same as the black and blue bar code. As a result of this property, any one color channel is sufficient to obtain a complete image of the object. Accordingly, the optical subsystem is designed to enhance axial chromatic aberration. Different color channels focus at different image distances. The color channel that is in best focus for the actual object distance is used as the image of the object. Enhancing the axial chromatic aberration extends the effective depth of field of the overall system since it extends the range over which at least one of the color channels will be in focus. However, this approach is limited to this special class of objects and assumes that the entire object is located at a single object distance. It does not account for the possibility that different parts of the object could be at different object distances. The approach can also be energy inefficient since the out of focus color channels are not used.

Thus, there is a need for electro-optic imaging systems that can better image color objects while addressing some or all of the drawbacks of the current approaches.

SUMMARY OF THE INVENTION

The present invention overcomes the limitations of the prior art by using color correlation information to compensate for poor quality optical imaging of certain color channels.

In one embodiment, an electro-optic color imaging system includes an optical subsystem, a detector subsystem and a digital image processing subsystem. The system is used to image a color-correlated object. In the optical subsystem, each color channel is focused to an image surface (typically either planar or curved) and the image surfaces for different color channels are separated from each other. For example, if the image surfaces are planar, then the image surface for the red channel may be in front of or behind the image surface for the green and blue channels. As another example, different color channels may exhibit different paraxial image distances. That is, the paraxial image point for different color channels is axially separated to introduce significant axial chromatic aberration. As a result, one color channel may be in focus while the others are out of focus. The detector subsystem is located at a fixed image distance from the optical subsystem and captures the different color channel images of the object. The image processing subsystem estimates the image of the object by combining the captured color channel images based at least in part on an a priori estimate of the correlation between the color channels.

In one particular application, the color correlation is used to increase the depth of field of the electro-optic imaging system. The range covered by the substantially non-overlapping image surfaces is sufficient to span the increased depth of field. As a result, the imaging system has a depth of field that is larger than that of an equivalent monochromatic system with a same F/#. For example, in one implementation, the image processing subsystem at least infers the object distance from the captured color channel images and sharpens each color channel image using a filter that is based on that color channel and on the object distance. Oriented and/or rotationally symmetric channel-pass filters (e.g., edge filters and/or Laplacian filters) can be applied to the color channel images to infer the object distance. Multichannel Wiener filtering can be used to sharpen the color channel images using a priori color correlation information.

In another aspect, the image surfaces may be non-planar. For example, they may be curved due to residual field curvature. As a result, at a given object distance, different color channels may be in focus over different portions of the active area of the detector subsystem. A blue channel image may be in best focus over the spatial region centered on the optical axis, a green channel image over an annular region surrounding the blue area of best focus, and the red channel image over the annular region at the periphery of the active sensing area.

In another aspect, optical subsystems with increased axial chromatic aberrations are used with a grayscale detector subsystem which integrates a wide range of spectral regions to produce a grayscale image. A priori knowledge about the color correlation of the object allows extending the depth-of-field as the polychromatic MTF functions do not have zero crossings up to the sample rate for a large depth of field.

Other aspects include specific lens designs. Other aspects of the invention include methods corresponding to the devices and systems described above, and applications for all of the foregoing.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The invention has other advantages and features which will be more readily apparent from the following detailed description of the invention and the appended claims, when taken in conjunction with the accompanying drawings, in which:

FIGS. 7a-7b show simulated text captured by the traditional imaging system of FIG. 5.

FIGS. 8a-8b show simulated text captured by the color-correlated imaging system of FIG. 6.

FIGS. 10a-10b show simulated text corresponding to the images of FIGS. 8a-8b, after sharpening by the digital image processing subsystem.

FIGS. 12a-12c show the physical layout, MTF and paraxial field curvature for a singlet, in accordance with the invention.

FIGS. 13b-13c show the point spread function for the blue and red channels, respectively, of the image in FIG. 13a.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Design Using Color Correlation

Figure 1:
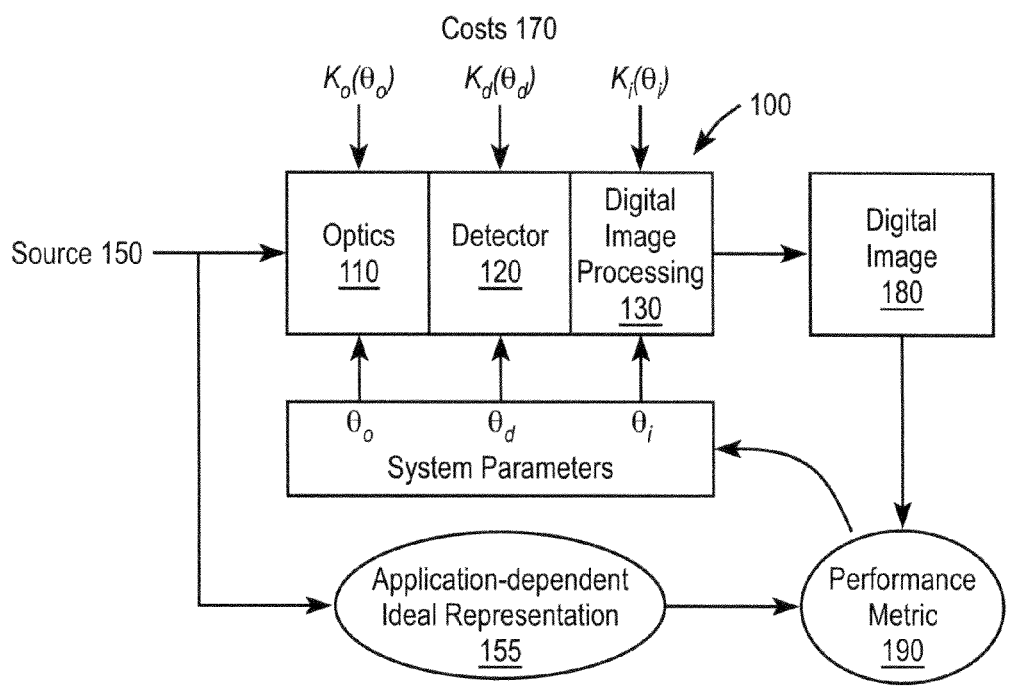
FIG. 1 is a block diagram illustrating the problem of designing an electro-optic imaging system.

FIG. 1 is a block diagram illustrating the problem of designing an electro-optic imaging system 100. The imaging system 100 includes an optical subsystem 110, detector subsystem 120 and digital image processing subsystem 130. In this particular example, the digital image processing subsystem 130 includes digital filter(s) to filter the image captured by the detector subsystem 120. The imaging system 100 is intended to image a multi-color object 150 and produces digital image 180. The different color channels of the object are assumed to be correlated. The correlation will be determined a priori and the image processing subsystem 130 will use the a priori correlation information improve the overall performance of the system. Accordingly, the design requirements for other portions of the imaging system (e.g., the optical subsystem) can be relaxed. The general design problem is to design the imaging system 100 to "optimize" its overall performance, subject to certain constraints. In many cases, the goal of optimization is to produce a digital image 180 which matches the application-specific idealized version 155 of the input object.

Figure 2:
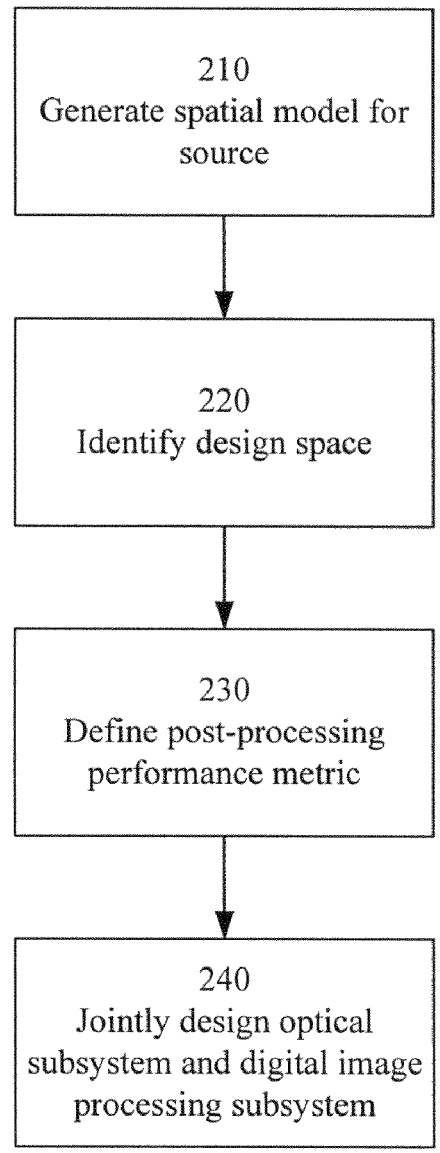
FIG. 2 is a flow diagram illustrating a method for designing an electro-optic imaging system according to the present invention.

FIGS. 1 and 2 illustrate an example method for designing an electro-optic imaging system 100 according to the present invention. Referring to FIG. 2, the design method includes generating 210 some sort of spatial model of the object 150. The spatial model of the object may be derived for a specific situation, empirically measured, based on previously developed models or otherwise provided. Illumination, radiometry and geometry are factors that may be reflected in the object model. The spatial model preferably includes a statistical model of the object. In this particular case, the spatial model includes the correlation between different color channels.

The design space for the electro-optic imaging system is also defined 220. In FIG. 1, each of the subsystems is defined by its parameters $\theta_o$, $\theta_d$ and $\theta_i$, respectively. For example, the design space for the optical subsystem 110, described by the vector $\theta_o$, may be defined by number, type and size of lenses, radii of curvature, stops, etc. The design space for the detector subsystem 120, described by the vector $\theta_d$, may parameterize the number of pixels, detector spacing, fill factor, bandwidth, pixel geometry, etc. In this particular example, the digital image processing subsystem 130 includes digital filter(s) so the design space for the digital image processing subsystem 130, described by the vector $\theta_i$, may identify the parameters for the digital filter(s) (e.g., number of coefficients, coefficient values, etc). Various non-imaging constraints or costs 170 associated with the designs may also be defined. The size of the design space of each subsystem will vary depending on the application. In some cases, there may be much latitude in designing a subsystem. In other cases, the design of the subsystem may be tightly constrained or even pre-defined (e.g., if the detector array is selected beforehand).

A post-processing performance metric 190 is also defined 230. The performance metric is post-processing in the sense that it is based on performance after image processing rather than before image processing. For examples, measures of the wavefront error or spot size of the intermediate optical image produced by the optical subsystem alone may be conventional error metrics for the optical subsystem but they are not post-processing performance metrics. In FIG. 1, the post-processing performance metric 190 is based on a comparison of the digital image 180 produced by the imaging system 100 compared to the ideal digital image 155. In many design situations, the image 180 produced by the system is calculated by modeling propagation of the object characteristics 150 through the subsystems 110, 120 and 130 based on the spatial model of the object.

The design step 240 can be described as selecting a design within the design space that optimizes the post-processing performance metric 190, possibly subject to certain constraints. The optical subsystem 110 and the digital image processing subsystem 130 are designed together, rather than sequentially as is the case in conventional design approaches. Mathematically, using the notation of FIG. 1, the design step can be described as selecting the system parameters $\theta_o$, $\theta_d$ and $\theta_i$ to directly optimize the performance metric, possibly subject to certain constraints on the costs 170. For example, an image-based post-processing performance metric 190 may be optimized subject to a maximum financial cost. Alternately, the financial cost may be minimized subject to some minimum acceptable post-processing performance metric 190 for the digital image 180.

A number of optimization algorithms can be used. For some linear cases, parameters may be solved for analytically or using known and well-behaved numerical methods. For more complicated cases, including certain nonlinear cases, techniques such as expectation maximization, gradient descent and linear programming can be used to search the design space.

Note that in both FIGS. 1 and 2, there is no requirement for the optical subsystem 110, the detector subsystem 120 or the digital image processing subsystem 130, taken alone, to be optimal. It is quite possible for these subsystems to exhibit less than optimal performance when considered alone, while the overall electro-optic imaging system 100 still exhibits good or even optimal performance. This is in direct contrast to conventional design methods where, for example, the optical subsystem 110 typically is designed by directly optimizing the image quality of the intermediate optical image formed by it. For example, the optical subsystem 110 may be designed to minimize chromatic aberration, the RMS wavefront error and/or the RMS spot size. In contrast, for the design approach of FIG. 2, the intermediate optical image formed by the optical subsystem 110 may have worse image quality (e.g., as measured by chromatic aberration, wavefront error or spot size), which is then corrected by the digital image processing subsystem 130. The optical subsystem 110 is not designed based directly on improving the image quality of the intermediate optical image. Rather, it is designed jointly with the digital image processing subsystem 130, based directly on optimizing the post-processing performance metric 190.

The following descriptions provide further examples of models of the object 150, optical subsystem 110, detector subsystem 120 and digital image processing subsystem 130. One specific model (but not the only model) is described, thereby presenting a unified framework for end-to-end performance evaluation.

Beginning with the object 150, the design method of FIG. 2 includes a spatial model of the object 150 when possible. In most scenarios, the universe of all possible objects to be imaged is naturally constrained by the application, and the boundedness of this space can offer important prior information for the system designer. In particular, this invention addresses the situation where there is correlation between different color channels.

In one approach, suppose that there exists a three-dimensional object luminance function, $s_{obj}(x', y', z', \lambda)$, which results from the complex interaction between three-dimensional scene geometry, reflectance, and illumination. In this simplified spatial model, assume that the signal represents the radiant intensity of incoherent light with wavelength $\lambda$ emanating from points in the three dimensional space defined by $(x', y', z')$. The purpose of the electro-optic imaging system 100 is to capture the two-dimensional projection of this signal.

In one embodiment, the post-processing performance metric 190 is based on a comparison of the actual (or simulated) image 180 to some ideal image 155. The ideal image 155 can be modeled in different ways, one of which is presented below. In this example, the idealized forward model at wavelength $\lambda$ can be modeled as $$s_{ideal}[j, k, \lambda] = [B_T(x, y) * P(s_{obj}(x', y', z', \lambda))]|_{x=Tj, y=Tk} \quad (1)$$
$$= [B_T(x, y) * s_{proj}(x, y, \lambda)]|_{x=Tj, y=Tk}$$
$$= [s_{img}(x, y, \lambda)]|_{x=Tj, y=Tk}$$

where $P(\cdot)$ represents the ideal projective (pinhole) transformation into the image coordinate space $(x, y)$ and $B_T(\cdot)$ is an ideal bandpass filter with cutoff frequency matched to the spatial sampling period T. The indices $(j, k)$ represent the indices of the pixel locations of the final sampled image. Because the ideal image $S_{ideal}$ 155 is the goal for the imaging system 100, the effects of the subsystems are formulated in terms of their effect on the idealized image $S_{ideal}(j, k, \lambda)$. As such, this model distinguishes between the object function s in the three-dimensional object space $s_{obj}$, after being projected onto the image plane $s_{proj}$, after passing through some idealized optics $s_{img}$ and after being sampled $S_{ideal}$. It is often convenient to represent the ordered collection of the samples $S_{ideal}$ by the vector s.

Figure 3:
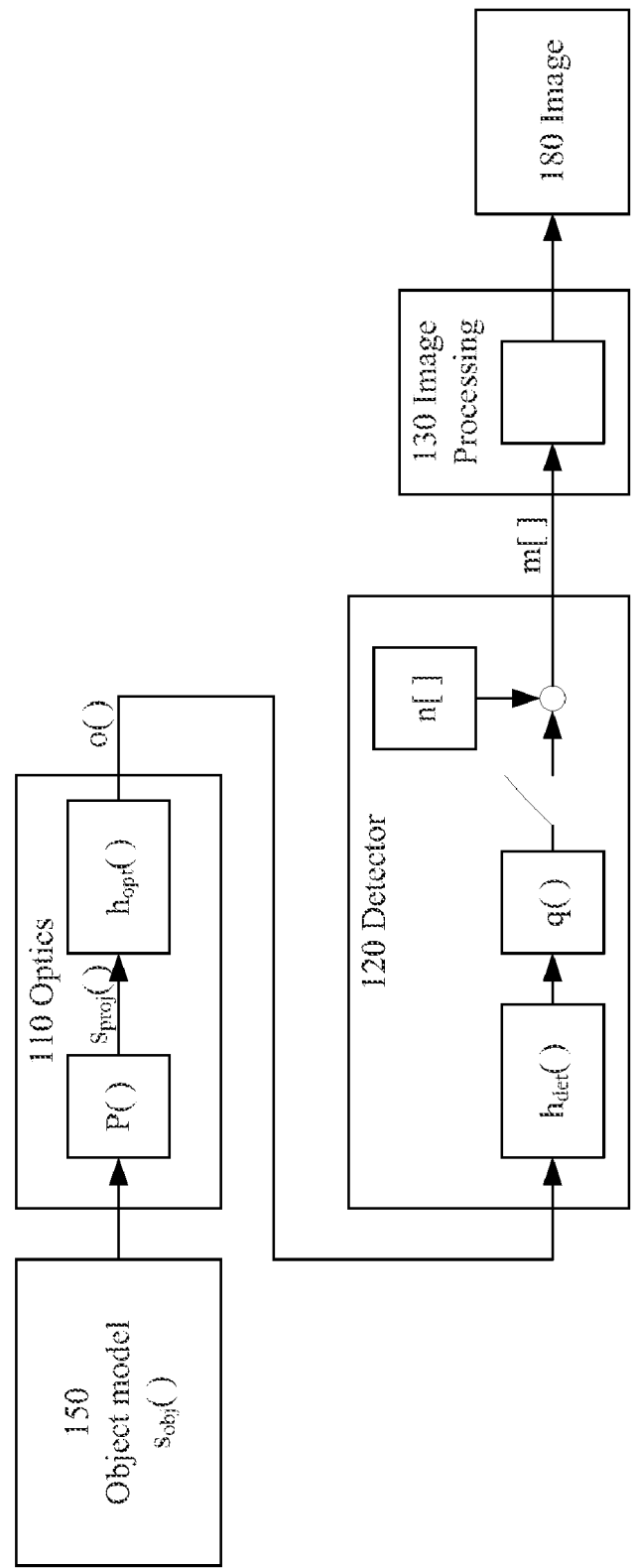
FIG. 3 is a block diagram of a model of an electro-optic imaging system.

Moving now to the actual image 180, FIG. 3 is a block diagram of a model of the electro-optic imaging system that produces the actual image 180. Information used to produce the spatial model of the object 150 may take several forms. For example, the designer may possess detailed information about the three-dimensional geometry of the scene under consideration. The spatially varying luminance properties of the scene may also be used to model the object 150. For instance, when dealing with text or textual document images, the designer may have information relating to the language of the imaged text, or that the signal represents a binary object, etc. In one approach, the information about the object signal is assumed to be statistical in nature and is modeled by a power spectral density function. Such information might be extracted from a corpus of objects representative of the objects to be imaged by the fielded system or modeled from physical first principles. This knowledge can be especially useful in designing the digital image processing subsystem. Many image processing techniques rely on prior information regarding the contents of the scene under observation as imaged by an idealized imaging system.

Moving now to the optical subsystem 110, for a particular wavelength of light λ the forward optical imaging model can be expressed as $$o(x,y) = \int h_{opt}(x,y,\tilde{x},\tilde{y}) s_{img}(x,y) d\tilde{x} d\tilde{y} \quad (2)$$

where o(x, y) is the optical image after the ideal projected optical image $s_{img}(x, y)$ (produced by the projective transformation P( )) is blurred by the spatially varying point spread function (PSF) $h_{opt}(x, y, \tilde{x}, \tilde{y})$. The digital image m[j, k] after being sensed by the photodetector 120 is given by $$m[j,k] = q(\int h_{det}(x-\tilde{x}, y-\tilde{y}) o(x,y) d\tilde{x} d\tilde{y})|_{x=Tj,y=Tk} + n[j,k] \quad (3)$$

where $h_{det}(x, y)$ is the spatially invariant detector integration function, T is the pixel separation or spatial sampling rate, q( ) is the quantization associated with the detector, and n[j, k] is the random noise associated with the detection process.

This forward model can be approximated by the linear model $$m = Hs + n \quad (4)$$

where s is the vector of samples of the bandlimited input image $S_{ideal}[j, k]$, H is the matrix representing the cumulative effects of both the optical point spread function $h_{opt}(x, y, \tilde{x}, \tilde{y})$ and the sensor integration function $h_{det}(x, y)$, and n represents the additive random noise due to the detector. The units j and k represent the indices after sampling. The form of Eqn. 4 is useful primarily as a simplified representation. The actual simulation need not explicitly construct such matrices.

In the case of multi-spectral imaging, an equation similar to Eqn. 4 can be developed for each color channel. For example, consider a three-color imaging system based on red, green and blue color channels, suppose that the ideal image s can be decomposed into a red channel image $s_R$, a green channel image $s_G$, and a blue channel image $s_B$. Let $C_s$ be the correlation matrix for image s. Furthermore, for simplicity, assume that the spatial correlation is the same across the color channels and is represented by the matrix $C_w$. In this case, the full correlation matrix for ideal image s is given by $$C_s = P \otimes C_w \quad (5)$$

where ⊗ is the Kronecker product and P is the 3×3 matrix capturing the color correlations. If it is further assumed that all three color channels have equal power and equal cross-correlation strength, the color cross-correlation matrix is given by $$P = \begin{bmatrix} 1 & p & p \\ p & 1 & p \\ p & p & 1 \end{bmatrix} \quad (6)$$

where 0<p<1 is the correlation coefficient between the three color channels. In the case of printed grayscale objects, the color correlations are very strong and the correlation matrix approaches a matrix of all ones. The example above is simplified to illustrate certain principles. The invention is not limited to this example, and is equally applicable to more complicated spectral relationships such as having different spatial correlation structures for each wavelength, different correlations between the wavelengths, and/or more than three wavelengths.

This color correlation information can be used to design the electro-optical imaging system by building an end-to-end model of performance based on predicted mean-square-error (MSE). Consider an example where the design goal is to achieve an increased depth of field (i.e. operation over a range of object distance d). In the case of color imaging, the three-color version of Eqn. 4 is given by $$\begin{bmatrix} m_R \\ m_G \\ m_B \end{bmatrix} = \begin{bmatrix} H_R(\theta, d) & 0 & 0 \\ 0 & H_G(\theta, d) & 0 \\ 0 & 0 & H_B(\theta, d) \end{bmatrix} \begin{bmatrix} s_R \\ s_G \\ s_B \end{bmatrix} + n \quad (7)$$

where the terms $H_i(\theta, d)$ represent the sampled point spread functions for the different color channels as a function of the optical design parameters θ and the object distance d. The term n represents the Gaussian additive noise with standard deviation σ. It can be shown that the MSE for the ideal Wiener filter is given by $$MSE(\theta, d) = Tr\left[\left(\frac{1}{\sigma^2}\right) H^T H + C_s^{-1}\right)^{-1}\right] \quad (8)$$

where Tr[ ] is the trace operator.

Eqn. 8 shows that the MSE is a function of both the design parameters θ, the object distance d (implicit in H), and the signal correlation matrix $C_s$. If the color correlation has the form of Eqn. 6, then as the correlation between the color channels increases, the term $$\frac{1}{\sigma^2}$$

$H^T H + C_s^{-1}$ becomes better conditioned leading to improved MSE performance.

The predicted MSE formulation of Eqn. 8 can be used for the end-to-end design of an electro-optic imaging system by optimizing the MSE over the design variables θ. As an example, consider the design of an extended depth of field imaging system. Assume that the desired depth of field range is ±δ. The following is an appropriate penalty function $$P(\theta) = \sum_i MSE(\theta, d_i) \quad (9)$$

where $d_i$ represents different object distances within the depth of field range, indexed by i. That is, the penalty function is a sum of the MSE taken at various object distances $d_i$ within the desired depth of field ±δ. In an alternate approach, the sum can be a weighted sum or the object distances $d_i$ can be sampled non-uniformly to reflect the desired weighting.

Using this approach, the depth of field can be increased by balancing the color correlation information with the axial color separation due to chromatic aberration. Rather than focusing all three wavelengths at a single image plane, the different wavelengths are focused at axially separated image planes. Then, imaging processing finds the color channel with the best contrast and extends this information to the other color channels using the strong color correlation information. In this way, the depth of field of the imaging system is increased without sacrificing spatial resolution. Below, we describe the application of color correlation to image reconstruction in more detail.

Figure 4C:
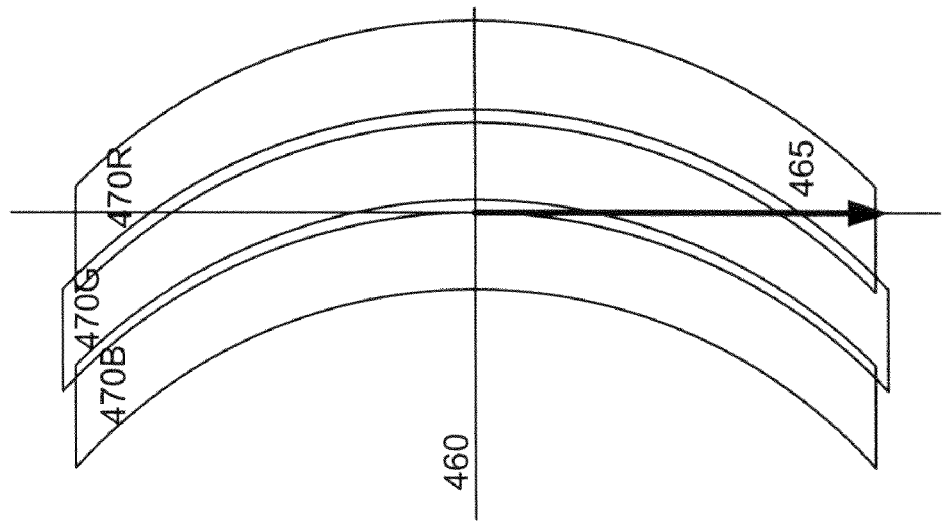
FIGS. 4b and 4c illustrate the red, green and blue image surfaces for example imaging systems according to the invention.
Figure 4B:
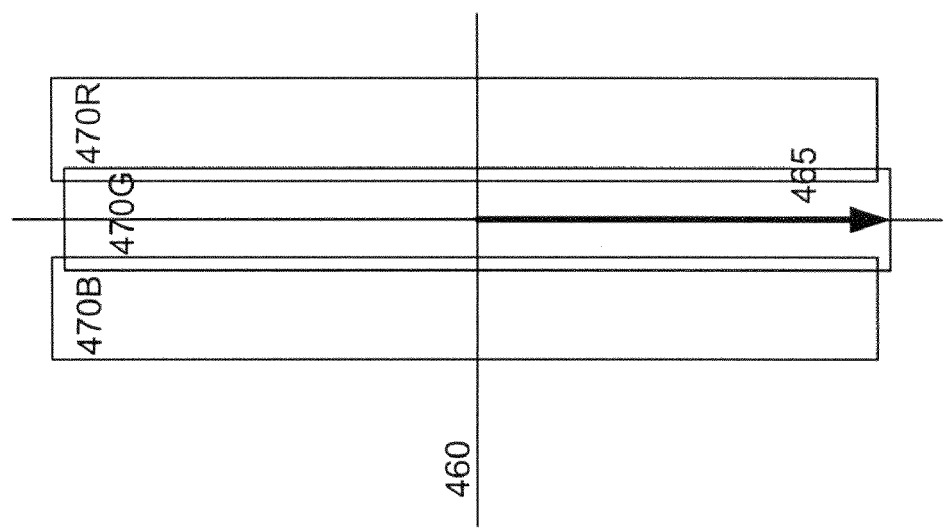
Figure 4A:
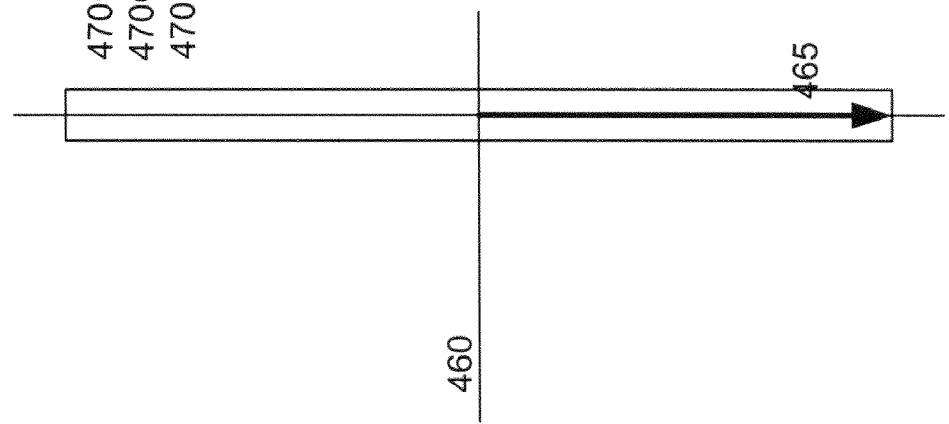
FIG. 4a (prior art) illustrates the red, green and blue image surfaces for a traditional color-corrected imaging system.

This is illustrated in FIG. 4. FIG. 4a depicts the image plane of a traditional color-corrected system. In this figure, 460 is the optical axis, and arrow and line 465 represent the nominal image plane of the system. There are three color channels, each of which is represented by a rectangle 470R, 470G and 470B. In FIG. 4a, the three rectangles 470 are overlapping. Each rectangle 470 represents the "image volume" for that color channel. In other words, the active area of the detector subsystem 120 must be located within the image volume in order for the detector subsystem to image that color channel with acceptable quality. In a traditional, color-corrected system, the red channel nominally will be focused at a specific image plane, and acceptable deviations from the nominal position of the image plane result in the rectangular image volume 470R. A sensor located towards the front or towards the back of the rectangular image volume 470R will capture slightly blurred images, but still within acceptable tolerances. A similar situation exists for the green and blue channels. Further, all three channels are ideally focused at the same image distance since the goal is to minimize axial chromatic aberration. As a result, the three rectangular image volumes 470 overlap significantly, as shown in FIG. 4a.

FIGS. 4b and 4c show situations where color correlation is used to extend the aggregate image volume of the system. Since the different color channels are correlated, not all channels must be sharply focused across the entire detector. Out of focus channels can be compensated using the other in-focus channels, coupled with the color correlation information. As a result, in FIGS. 4b and 4c, the image surfaces for the three color channels are separated and the corresponding image volumes 470 are substantially non-overlapping.

In FIG. 4b, the three image volumes 470 are generally rectangular in shape but are axially displaced relative to one another. This means that, at any given image distance, some of the channels will be out of focus (which will be compensated by the color correlation), but at least one of the color channels will be in focus over a greater range of image distances. The effective image volume for the overall system is the aggregate image volume for all three color channels. The larger image volume means that there will be a larger tolerance on the position of the detector or, equivalently, that the system will have a larger depth of field for a given sensor position compared to an equivalent monochromatic system (or color-corrected polychromatic system) with the same F/#.

Figure 15:
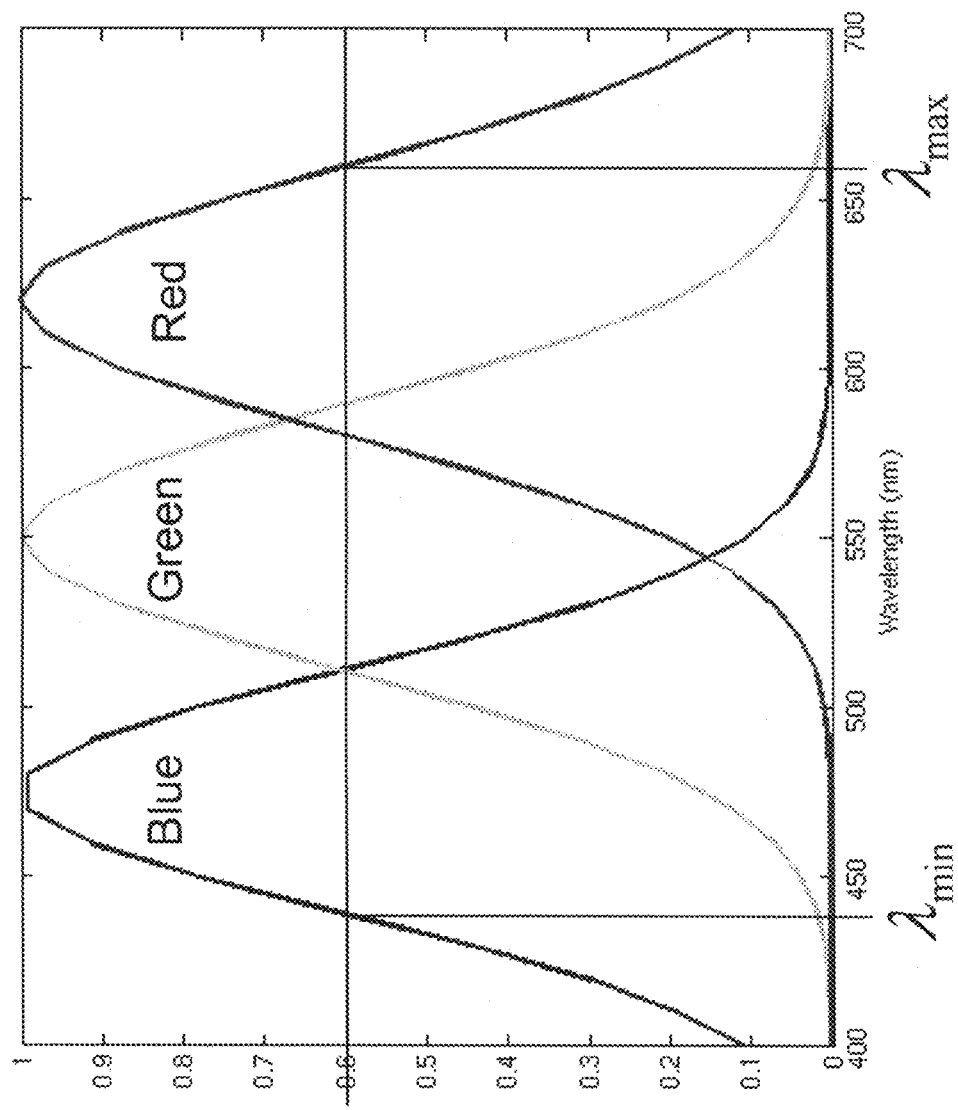
FIG. 15 is a graph of the spectral responses of a multiple color channel detector subsystem.

This effect can be quantified by, for example, defining a "chromatic depth of focus ratio" of a polychromatic imaging system in the following way. Let $\lambda_{min}$ be the minimum wavelength detected at a relative sensitivity of at least 60% (other thresholds can also be used). Let $\lambda_{max}$ be the maximum wavelength detected at a relative sensitivity of at least 60%. FIG. 15 shows a representative example of the spectral response of a multiple color channel (RGB) imaging system. In this example, $\lambda_{min}$ is around 440 nm and $\lambda_{max}$ is around 660 nm. All wavelengths between $\lambda_{min}$ and $\lambda_{max}$ also have a relative sensitivity of at least 60%. The paraxial back focal distance is a function of wavelength and is denoted by $BFL(\lambda)$. One measure of this effect of "spreading out" the overlapping image volumes is the range of back focal lengths:

$$\Delta BFL = \max\{BFL\} - \min\{BFL\} \tag{10}$$

where the max and min are taken over the wavelength range $\lambda_{min}$ to $\lambda_{max}$. In many cases (such as in FIG. 4), this range of back of focal lengths will reduce to $$\Delta BFL = BFL(\lambda_{max}) - BFL(\lambda_{min}) \tag{11}$$

since the max {BFL} will occur at $\lambda_{max}$ and the min {BFL} will occur at $\lambda_{min}$.

Furthermore, the diffraction limited depth of focus at a specific wavelength is $2\lambda(FN)^2$ where FN is the F/# at that wavelength. Note that FN also varies with wavelength. In conventional systems (as shown in FIG. 4a), the goal is to design the optical system so that ΔBFL does not exceed some constant (usually less than one) times $2\lambda(FN)^2$. In this way, all back focal lengths will fall in a range that is within the diffraction limited depth of focus. The spreading effect seeks to achieve the opposite. Its quantification can be normalized by dividing ΔBFL by the depth of focus measure $2\lambda(FN)^2$. Different depths of focus can be used: the average value of $2\lambda(FN)^2$ over the wavelength range, the value of $2\lambda(FN)^2$ at the average wavelength, the max or min values, etc. In the case of FIG. 4, assuming that the aperture size is the same for all wavelengths, the minimum value of $2\lambda(FN)^2$ occurs at $\lambda_{min}$ since both $\lambda$ and FN are minimum at $\lambda_{min}$. Using this approach yields a normalized quantity:

$$\{BFL(\lambda_{max}) - BFL(\lambda_{min})\} / \{2\lambda_{min}[FN(\lambda_{min})]^2\} \tag{12}$$

This quantity will sometimes be referred to as the chromatic depth of focus ratio (CDOFR). In certain embodiments, the CDOFR>5.

Other variations of this approach can be used to quantify the spreading effect. For example, the wavelength range of interest can be defined by different thresholds, for example 50%, 60%, 70%, 80%, full width half maximum, or a threshold that is equal to the lowest "valley" between the main peaks in the spectral response. It can also be defined by absolute sensitivity rather than relative sensitivity. In another aspect, different measures of the spread of image volumes can be used, other than max-min. As discussed above, if a normalized quantity is used, normalization factors other than the minimum value of $2\lambda(FN)^2$ can also be used: maximum or average values for example. Finally, the requirement shown does not have to be >5. Other minimum numbers or ranges of numbers can also be used, for example >2.

For convenience, a specific CDOFR is defined as follows. The wavelength range is defined by full width half max of the relative spectral response. The spread of image volumes is defined by Eqn. (12) and the quantity is normalized by $2\lambda(FN)^2$ evaluated at the minimum wavelength $\lambda_{min}$. This particular quantity will be referred to as the full width half max chromatic depth of focus ratio, or FWHM CDOFR. Alternately, in some cases a CDOFR will be referenced with respect to a wavelength range, or with respect to a min and a max wavelength. In those cases, the CDOFR is intended to be evaluated using Eqn. (12) and the applicable min and max wavelengths.

In FIG. 4c, the image volumes 470 have front and back surfaces that are not substantially planar. Rather, they are curved. For example, this can occur if the conventional requirement on the correction of field curvature is relaxed. For the detector position 465 shown, there is not a single color channel that is in focus over the entire active area of the detector. Rather, different color channels are in focus over different portions of the active area. The blue channel image may be in best focus over a circular spatial region centered on the optical axis, the green channel image over an annular region surrounding the blue area of best focus, and the red channel image over the annular region at the periphery of the active sensing area.

The color filter array (CFA) pattern on the sensor can take advantage of this property of the optical subsystem. For example, when designing a fixed focus imaging system using such an optical subsystem, the pixels near the optical axis could have a greater concentration of blue filters, a higher concentration of green filters in the annular region around the central region, and a higher concentration of red filters at the edge of the sensor field. More generally, different pixels within the detector subsystem are sensitive to different color channels and the concentration of these color-specific pixels can be designed to depend on which of the color channels is relatively in focus. Also, the relative concentration in the horizontal or vertical direction could change over the image field as a function of the wavelength-specific properties of the lens system.

Note also that "in focus" is a relative term and, given that captured images may be sharpened by subsequent image processing, the "in focus" color channel images captured in FIGS. 4b and 4c may tolerate more blur than the "in focus" images of FIG. 4a.

Example 1

Web Camera

As an example, consider a triplet lens systems satisfying the general design requirements for a web-camera imaging system. The requirements for this example system were F/3.0 or faster, f=4.6 mm, 40 degree field of view, ¼" sensor with 3.5 micron pitch pixels (i.e. 3.5 micron/4.6 mm=0.75 mrad angular resolution), <7 mm total track length from first lens surface to sensor (i.e., total length<1.5×focal length), and <5% distortion. The system is designed for a detector having the spectral responses shown in FIG. 15.

Figure 5C:
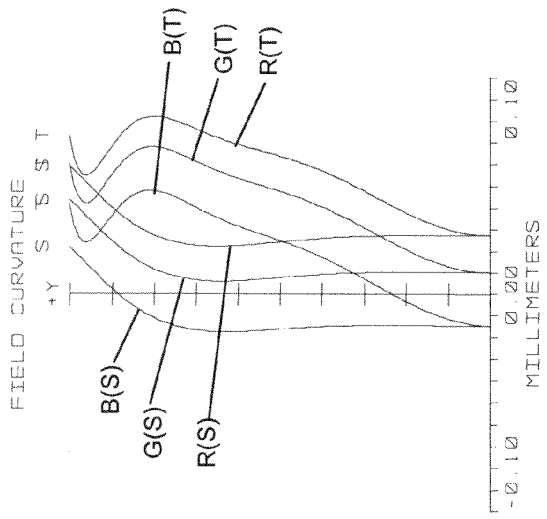
FIGS. 5a-5c show the physical layout, MTF and paraxial field curvature for a traditional triplet suitable for use with cell phones.
Figure 5A:
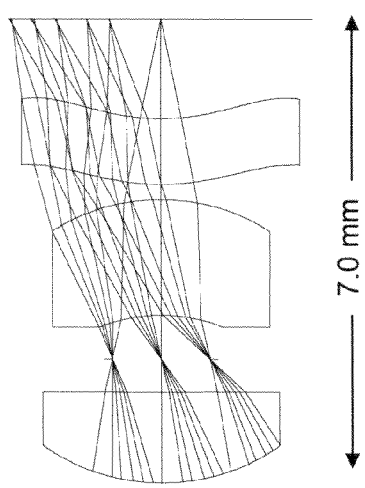
Figure 5B:
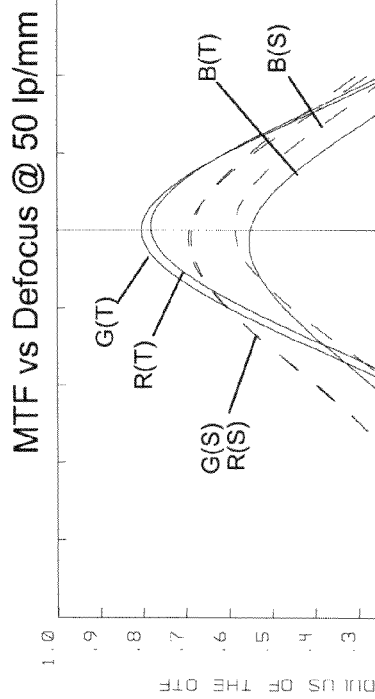

FIGS. 5-9 compare a traditional color-corrected triplet against a triplet system designed using the approach described above. FIG. 5 shows a traditional triplet that is corrected for axial color. All three wavelengths (λ=0.48, 0.55, 0.62 µm) are focused at a single image plane (see also FIG. 4a). The physical layout is shown in FIG. 5a. The optimized design is an F/3.0 lens system with a track length of 7.0 mm including a single plastic asphere as the third lens element. The global optimization varied the glass types to find the best solution. FIG. 5b shows the MTF as a function of shift about the image plane for the 50 lp/min spatial frequency. There are six curves in FIG. 5b labelled X(Y) where X is R, G or B to indicate the wavelength and Y is T or S to indicate tangential or sagittal. Note that all three wavelengths show MTF contrast which falls off rapidly due to defocus as we move away from the nominal image plane. The chromatic depth of focus ratio for this system (using the 60% definition for the wavelength range) is 3.5.

Figure 6C:
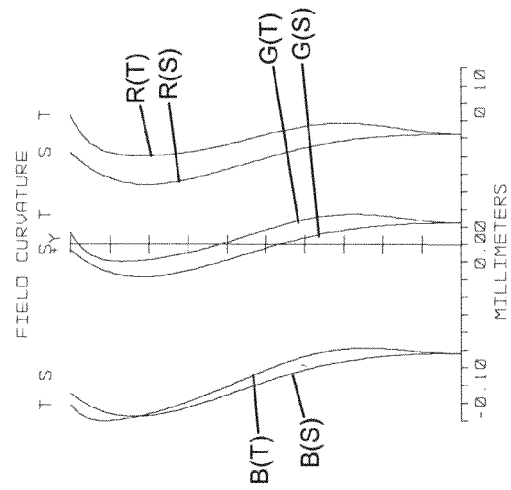
FIGS. 6a-6c show the physical layout, MTF and paraxial field curvature for a triplet suitable for use with cell phones, in accordance with the invention.
Figure 6A:
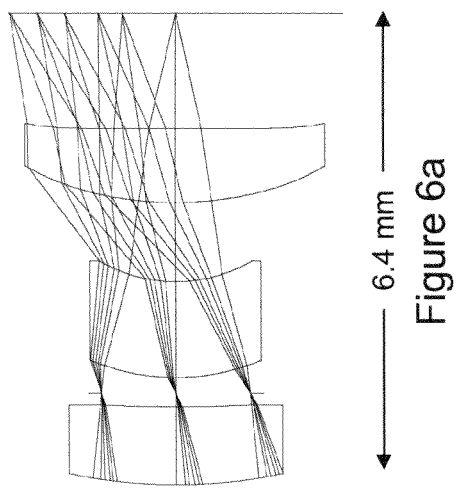

FIG. 6 illustrates a system designed using the predicted MSE merit function of Eqn. 9, assuming perfect color correlation between the color channels. The merit function optimized the MSE over the image distance of ±100 µm corresponding to a depth of field for the object of 100 mm to infinity. By relaxing the traditional design requirement of bringing all wavelengths to focus at the same location, we were able to find the design shown in FIG. 6. This design has a shorter track length and increased light gathering capacity of F/2.4. The corresponding chromatic depth of focus ratio for this system is 15.8. The optical prescription is given below:

TABLE 1

Optical prescription for triplet

| Surface | Type | Curvature | Thickness | Glass | Semi-Diameter |
|---|---|---|---|---|---|
| 0 | STANDARD |  | 5.00E+03 |  | 1.82E+03 |
| 1 | STANDARD | 2.11E-01 | 1.00E+00 | N-SF6 | 1.16E+00 |
| 2 | STANDARD | 7.66E-02 | 1.72E-01 |  | 8.83E-01 |
| 3 | STANDARD |  | 2.00E-01 |  | 8.04E-01 |
| 4 | STANDARD | 4.77E-01 | 1.21E+00 | LASF32 | 9.23E-01 |
| 5 | STANDARD | 6.94E-01 | 1.01E+00 |  | 8.29E-01 |
| 6 | EVENASPH | 3.03E-01 | 9.49E-01 | POLY-CARB | 1.58E+00 |
| 7 | EVENASPH | -3.42E-02 | 1.46E+00 |  | 1.59E+00 |
| 8 | STANDARD |  |  |  | 1.84E+00 |

| Surface | Conic | $p\hat{\,}4$ | $p\hat{\,}6$ | $p\hat{\,}8$ |
|---|---|---|---|---|
| 6 | 4.56E-01 | 0.00E+00 | 2.26E-04 | 4.29E-04 |
| 7 |  | 2.48E-02 | -8.76E-03 | 1.94E-03 |

Figure 6B:
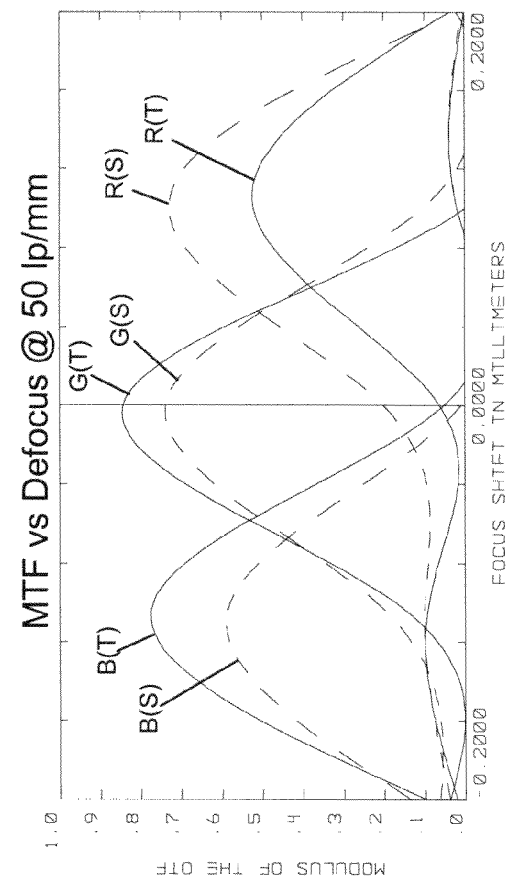

Examining the MTF curves of FIG. 6b shows that the different color channels focus at different image distances. As with FIG. 5b, R, G and B indicate the MTF is for the central wavelength of the red, green or blue color channel, and (T) or (S) indicates tangential or sagittal plane. The optical subsystem achieves this by using "flint" type glass for all of the optical elements. All of the lens materials used in this example have Abbe numbers less than 40. These highly dispersive materials exaggerate the axial chromatic aberration. Over the desired depth of focus, however, at least one of the color channels provides strong contrast. As will be explained below, the image processing subsystem can use this information to compensate for the other blurred channels. The detector subsystem is capable of separately capturing the two or more (in this case three) color channel images, for example by using a color filter array, or color filters, or multiple detectors.

Another way to see this effect is by examining the paraxial field curvature associated with these two lenses. FIGS. 5c and 6c plot the field curvature for these two different lens systems, with R, G and B indicating the color channel and T and S indicating tangential or sagittal. Here we see that the traditional design (FIG. 5c) sacrifices astigmatism in order to bring all three color planes nearly into focus. The new design (FIG. 6c), however, shows three distinct image planes with reduced astigmatism. In other words, the optical design is made easier by relaxing the traditional design goals.

FIGS. 7 and 8 compare simulated text images captured for both the traditional and the color-correlated imaging system. In these examples, the object is fixed at an object distance of 100 mm and the sensor position is varied. FIGS. 7a and 7b are simulated images for the traditional triplet where the sensor is located at the nominal image plane for an object at 100 mm (FIG. 7a) and then at the nominal image plane for an object at 10.0 m (FIG. 7b). FIGS. 8a and 8b show the same situations for the color-correlated lens system of FIG. 5 where the system is focused for an object with blue wavelength at 10.0 m. These examples show the effect of misfocus, as would be the case with a fixed position sensor and a varying object distance. When the traditional triplet is in focus (FIG. 7a), the image quality is high. However, when the triplet is out of focus (FIG. 7b), the simulated image becomes extremely blurry for all three color channels.

In contrast, FIGS. 8a and 8b are the corresponding figures for the color-correlated triplet. Here, we observe that when the detector is located at the image plane corresponding to a blue object distance of 100 mm (FIG. 8a), the blue channel is in focus but the red channel image is blurry. Alternately, when the detector is located at the image plane corresponding to a blue object distance of 10.0 m (FIG. 8b), the red channel is in focus, while the blue channel is blurry. However, the image processing system can correct for the blurry color channel images, given that the other channel is in focus and given the color correlation between the different channels.

Figure 9:
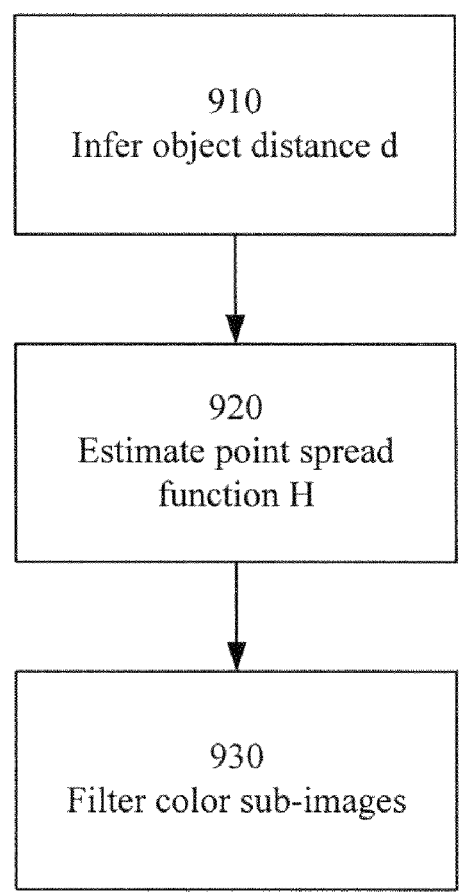
FIG. 9 is a flow diagram illustrating a method for combining color channel images according to the present invention.

FIG. 9 is a flow diagram illustrating a method for combining color channel images based at least in part on the correlation between the color channels. In FIG. 9, the image processing subsystem at least infers 910 the object distance d from the captured color channel images. In some cases, the image processing subsystem may expressly estimate the object distance d. In other cases, it may calculate related quantities, such as the relative sharpness of the different color channel images. In one approach, the image processing subsystem detects which channel is in focus. In the case of this triplet, a Laplacian edge detection filter works well to detect the color channel that is in focus. In the case of the triplet, a number of rotationally symmetric bandpass filters capture the sharpness of the individual color channel images. The ratio of the sharpness values (relative sharpness) for the two or more (in this case three) color channels provides the information with which to infer object depth.

After determining the relative sharpness of the different color channel images (from which, the image processing subsystem can infer the object distance), the grayscale image can be restored using the color correlation information. In one approach, estimating d allows the image processing subsystem to use the estimated depth information to define the 920 the point spread function $H_i(\theta, d)$ in Eqn. 7 for each of the color channels. From this, the image processing subsystem can filter 930 the color channel images based on the corresponding color-specific MTFs for the color channels. For example, multi-channel Wiener filters can be used to combine the multiple images.

In one approach, the object distance d is estimated by maximizing the cost function $$(H(d)^T m)^T \left(\frac{1}{\sigma^2}\right) H(d)^T H(d) + C_s^{-1})^{-1} (H(d)^T m)$$

over the possible depths. Once the depth d has been estimated, the reconstructed image can be computed by $$\hat{s} = \left(\frac{1}{\sigma^2}\right) H(d)^T H(d) + C_s^{-1})^{-1} (H(d)^T m) \quad (13)$$

This operation may be applied in a spatially-varying fashion over the image field to obtain a three-dimensional depth map and a high-contrast image.

Figures 10A, 10B:
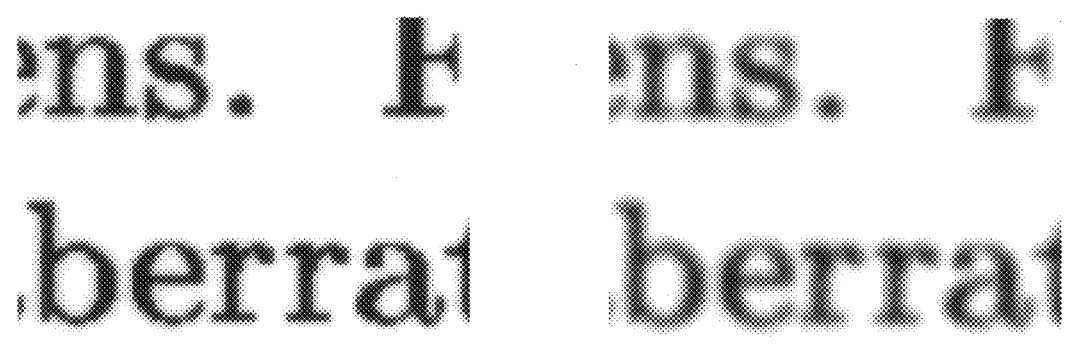

FIGS. 10a and 10b show the resulting images corresponding to FIGS. 8a and 8b, after restoration based on selecting the color channel that is most in focus.

Example 2

Extended Depth of Field Doublet

Figure 11C:
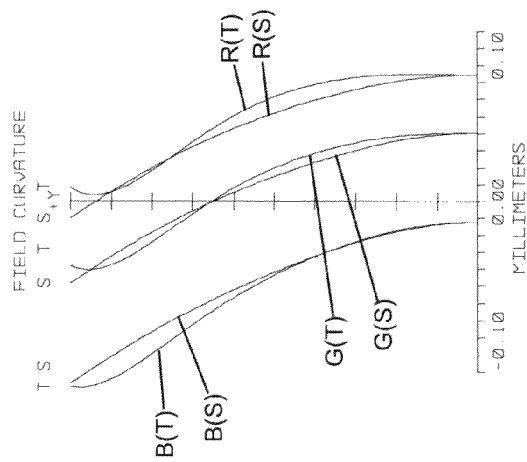
FIGS. 11a-11c show the physical layout, MTF and paraxial field curvature for a doublet suitable for use with cell phones, in accordance with the invention.
Figure 11A:
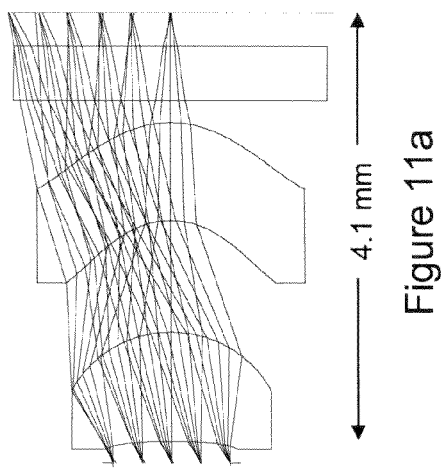

As another example, consider a design based on color correlations following the general design specifications of a VGA cell-phone camera system: F/2.8 or faster, f=2.4 mm, 60 degree field of view, 1/6" sensor with 3.5 micron pixels, RGB sensor having spectral responses shown in FIG. 15 in a Bayer pattern. The resulting lens has a chromatic depth of focus ratio (using the 60% definition for the wavelength range) of 11.9. The resulting lens is shown in FIG. 11a, with the optical prescription given below.

TABLE 2

| Optical prescription for doublet | | | | | |
|---|---|---|---|---|---|
| Surface | Type | Curvature | Thickness | Glass | Semi-Diameter |
| 0 | STANDARD | 0.00E+00 | 1.00E+04 | | 5.77E+03 |
| 1 | STANDARD | 0.00E+00 | 1.99E−01 | | 4.95E−01 |
| 2 | EVENASPH | −1.03E−01 | 1.00E+00 | POLYCARB | 5.58E−01 |
| 3 | EVENASPH | −1.05E+00 | 1.02E+00 | | 8.52E−01 |
| 4 | EVENASPH | −1.59E+00 | 8.95E−01 | POLYCARB | 8.96E−01 |
| 5 | EVENASPH | −1.21E+00 | 2.00E−01 | | 1.15E+00 |
| 6 | STANDARD | 0.00E+00 | 5.00E−01 | BSC7 | 1.30E+00 |
| 7 | STANDARD | 0.00E+00 | 3.00E−01 | | 1.35E+00 |
| 8 | STANDARD | 0.00E+00 | 0.00E+00 | | 1.41E+00 |

| Surface | Conic | $\hat{p}4$ | $\hat{p}6$ | $\hat{p}8$ | $\hat{p}10$ |
|---|---|---|---|---|---|
| 2 | 6.99E+01 | −2.59E−01 | −2.72E−01 | −7.10E−01 | −2.25E+00 |
| 3 | −8.23E−02 | −2.50E−03 | 1.68E−03 | −2.20E−02 | −4.00E−02 |
| 4 | −1.32E+00 | −2.43E−01 | 3.26E−01 | −5.06E−02 | 2.18E−02 |
| 5 | −2.05E+00 | −1.30E−01 | 1.05E−01 | −2.46E−02 | 9.37E−03 |

Figure 11B:
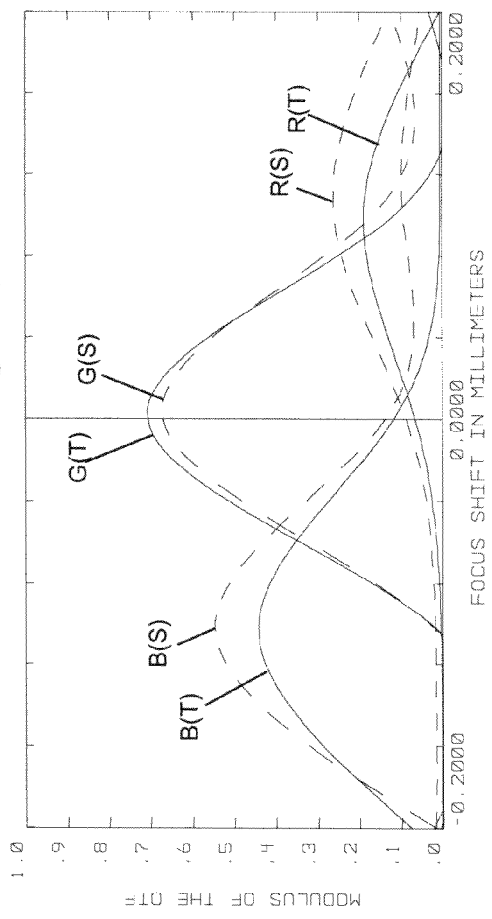

The general design includes two polycarbonate aspheric plastic lens elements. The BSC7 element is a cover plate for the sensor array. In a typical cell-phone imaging system, the color aberrations are balanced by making the first lens out of a low-dispersion plastic such as PMMA or COC. In this case, we use highly dispersive polycarbonate plastic to extend the depth of field. The lens has a ±30° field of view and a total track length of only 4.1 mm. It achieves a very fast F/2.3. Achieving these specifications for a traditional system would be very difficult due to the stringent requirements on both chromatic and geometric aberrations. This example design was optimized for a depth of field ranging from 90 mm through infinity for the object. FIG. 11b demonstrates the performance over the through-focus range of ±0.12 μm.

The doublet achieves the design specifications by using color correlation to relax the aberration requirements in an unconventional fashion. For example, achieving such a short track length imparts significant field curvature aberration as evidenced by the field curvature plots shown in FIG. 11c. This creates an interesting effect where different radial regions of the image are in focus in different color channels. For example, the lower right field curvature plots demonstrate that objects at infinity will be in focus near the optical axis for the blue channel and will be in focus for the red channel at the edge of the field (see also FIG. 4c). This phenomenon could be used to design extremely efficient fixed focus grayscale imaging systems by matching the color filter pattern on the photodetector to the in-focus color channel regions, as was described above (e.g., see FIG. 4c).

Example 3

Extended Depth of Field Singlet

As a final example, extend the concepts above to a single polycarbonate aspheric plastic lens. The lens achieves F/3.0 with a total track length of 3.8 mm for ±30° field-of-view using a ⅛" RGB sensor with 3.5 micron pixels. The focal length is 2.6 mm. The lens system is capable of grayscale imaging within a depth of field ranging from 100 mm to infinity. The system was designed for an RGB detector subsystem having the spectral responses shown in FIG. 15. The system has a chromatic depth of focus ratio of 7.6, using the 60% definition for the wavelength range. FIG. 12a shows the singlet, with the optical prescription given below:

TABLE 3

Optical prescription for singlet

| Surface | Type | Curvature | Thickness | Glass | Semi-Diameter |
|---|---|---|---|---|---|
| 0 | STANDARD | 0.00E+00 | 9.50E+01 | | 5.05E+01 |
| 1 | STANDARD | 0.00E+00 | 5.91E−01 | | 4.75E−01 |
| 2 | EVENASPH | 5.20E−01 | 9.31E−01 | POLYCARB | 9.56E−01 |
| 3 | EVENASPH | −1.52E−01 | 1.55E+00 | | 8.61E−01 |
| 4 | STANDARD | 0.00E+00 | 5.00E−01 | BSC7 | 1.27E+00 |
| 5 | STANDARD | 0.00E+00 | 3.00E−01 | | 1.36E+00 |
| 6 | STANDARD | 0.00E+00 | 0.00E+00 | | 1.44E+00 |

| Surface | Conic | $p\hat{\,}4$ | $p\hat{\,}6$ | $p\hat{\,}8$ | $p\hat{\,}10$ | $p\hat{\,}12$ |
|---|---|---|---|---|---|---|
| 2 | 2.23E+00 | 1.43E−01 | −3.00E−01 | 4.17E−01 | −2.89E−01 | 4.51E−02 |
| 3 | −1.53E+03 | 8.03E−02 | 2.15E−01 | −2.10E−01 | 1.67E−01 | 7.36E−02 |

The single imaging system is capable of achieving such challenging design requirements by using color correlations. FIG. 12b, which plots MTF contrast as a function of image distance, shows that no single color channel is completely in focus at any image distance. Instead, either the sagittal or the tangential orientation is in focus for a pair of color channels. Using the color correlations, vie are capable of tolerating significant astigmatism in the imaging system by combining the different orientation-specific contrasts across the color channels.

Figure 13A:
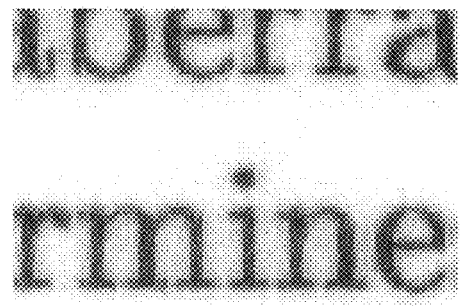
FIG. 13a shows a simulated image for the singlet of FIG. 12.
Figures 13B, 13C:
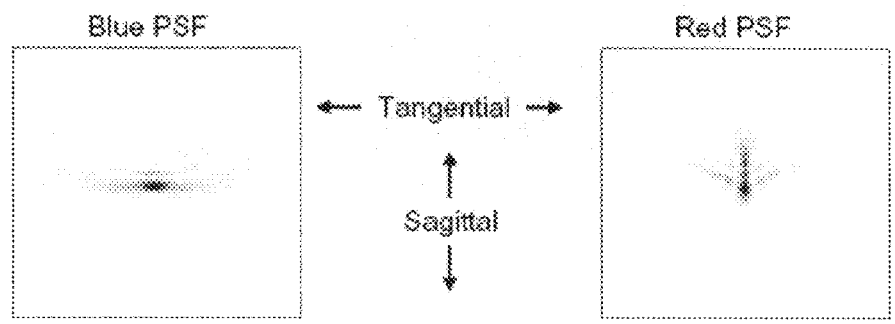

FIG. 13a shows an example of a simulated image located at 100 mm from the camera. The top image shows the simulated captured color image. The red channel image is in focus in the X direction (tangential) while the blue channel image is in focus in the Y direction (sagittal). FIGS. 13b and 13c show the point spread functions for the two different color channels. The PSF images depict the strong astigmatism aberration found in the optical system.

In one approach, angularly-oriented bandpass filters (e.g., edge filters) are used to estimate both the color channel and the orientation of best focus. Based on the output of these filters, the image processing system can estimate the object depth based on the orientation and relative strength of the image contrast over the three color channels. After estimating the depth, the image processing system combines the orientation and color portions of the image with best contrast to provide a high quality grayscale image.

Example 4

Extended Depth of Field Integrating Detector

Figure 14:
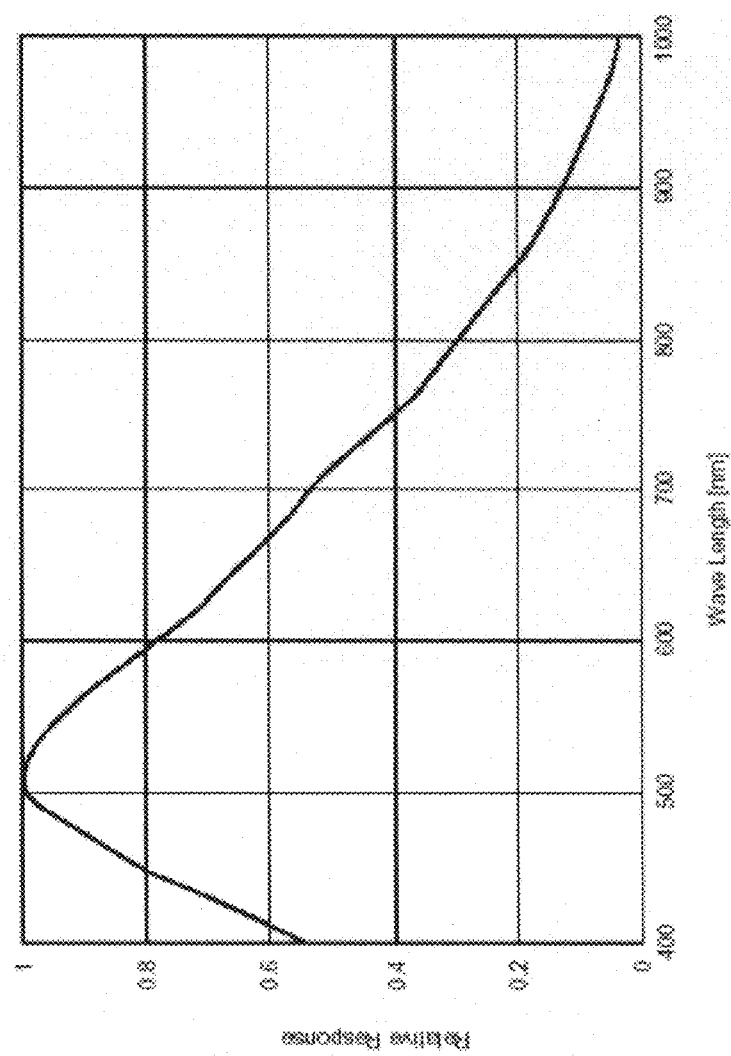
FIG. 14 is a graph showing a spectral response for a detector subsystem.

FIG. 14 illustrates an alternate approach to take advantage of color-correlation information. In this approach, the optical subsystem is designed to separate the image surfaces of different wavelengths, as in the above examples. Thus, the blue color image may be in focus while the red and green color images are out of focus. However, the detector subsystem does not capture separate red, green and blue color images. Instead, the detector subsystem captures a single "polychromatic" image by integrating over the different color channels, but weights them accordingly. FIG. 14 is a graph showing one possible spectral sensitivity for the detector. By taking the spectral weighting into account, even if the MTF for specific wavelengths or color channels falls below zero, the polychromatic MTF (i.e., the aggregate MTF integrated across all wavelengths) can be maintained above zero.

As an example, in FIG. 14, if the wavelengths around 650 nm have MTFs below zero for a particular spatial frequency (for example, because those wavelengths are out of focus) but the wavelengths around 500 nm have MTFs well above zero at the same spatial frequency, and if the images at 650 nm and 500 nm are strongly correlated, then the strong MTF around 500 nm can be used to compensate for the below zero MTF around 650 nm. The detector subsystem does this by producing a response that effectively integrates over the broad spectrum.

In one particular example, the objects are gray-scale objects so that all color channels are strongly correlated. The optical subsystem is designed to separate the image surfaces and has residual field curvature (see FIG. 4c). As a result, shorter wavelengths are more in focus towards the center of the detector array and longer wavelengths are more in focus towards the edge of the detector array. The detector array is designed so that its spectral sensitivity is stronger at the shorter wavelengths towards the center, and stronger at the longer wavelengths towards the edge. For example, different color filters can be used with detector pixels that otherwise have a broad spectral response.

The chromatic depth of focus ratio can be increased in different ways. In one approach, the glass or plastics types are chosen to amplify the ratio by using materials with low Abbe numbers (dispersive) on the positively powered lens elements. Using all crown glasses for multiple lens element systems also increases the chromatic depth of focus ratio. In addition, the use of diffractive optical elements can significantly increase the chromatic depth of focus ratio due to their high chromatic sensitivity.

Although the detailed description contains many specifics, these should not be construed as limiting the scope of the invention but merely as illustrating different examples and aspects of the invention. It should be appreciated that the scope of the invention includes other embodiments not discussed in detail above. For example, the term "color" is not intended to be limited to the visible, or to red, green and blue color channels. Color channels and color channel images can occupy other portions of the spectrum, for example the infrared. Other variations can use different numbers of color channels and color channel images, for example two or more. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. An electro-optic color imaging system for imaging a color-correlated object in at least two different color channels, the imaging system comprising:
    an optical subsystem that has a full width half max chromatic depth of focus ratio greater than 5 over the different color channels;
    a detector subsystem located at a fixed image distance from the optical subsystem, the detector subsystem capturing color channel images of the object at each of the different color channels; and
    a digital image processing subsystem coupled to the detector subsystem for estimating an image of the object by combining the color channel images based at least in part on an a priori estimate of the color correlation of the object.

2. An electro-optic color imaging system for imaginga color-correlated object in at least two different color channels, the imaging system comprising:
    optical subsystem that has a full width half max chromatic depth of focus ratio greater than 2 over the different color channels;
    a detector subsystem located at a fixed image distance from the optical subsystem, the detector subsystem capturing color channel images of the object at each of the different color channels; and
    a digital image processing subsystem coupled to the detector subsystem for estimating an image of the object by combining the color channel images based at least in part on an a priori estimate of the color correlation of the object.

3. The electro-optic color imaging system of claim 1 wherein the digital image processing subsystem at least infers the object distance from the captured color channel images and combines the color channel images using sharpening filters based on the color channel and on the object distance.

4. The electro-optic color imaging system of claim 3 wherein the digital image processing subsystem applies angularly oriented bandpass filters to the color channel images to infer the object distance.

5. The electro-optic color imaging system of claim 3 wherein the digital image processing subsystem applies rotationally symmetric bandpass filters to the color channel images to infer the object distance.

6. The electro-optic color imaging system of claim 1 wherein the color channel images are formed on image surfaces that are non-planar.

7. The electro-optic color imaging system of claim 6 wherein the image surfaces are curved due to field curvature.

8. The electro-optic color imaging system of claim 6 wherein, at a given object distance, one of the color channels is in best focus over a first central portion of anthe active area of the detector subsystem and a different color channel is in best focus over a different annular portion of the active area.

9. The electro-optic color imaging system of claim 6 wherein, at a given object distance, one of the color channels is in best focus over a first portion of an active area of the detector subsystem and a different color channel is in best focus over a different portion of the active area.

10. The electro-optic color imaging system of claim 9 wherein the active area comprises color-specific pixels, each of which is sensitive to one of the color channels, and the concentration of color-specific pixels for different color channels in a portion of the active area depends on which color channel is in best focus over that portion of the active area.

11. The electro-optic color imaging system of claim 10 wherein, for those portions of the active area over which a color channel is in best focus, the corresponding color-specific pixels for that color channel have the highest concentration.

12. The electro-optic color imaging system of claim 1 wherein the detector subsystem captures three color channel images of the object.

13. The electro-optic color imaging system of claim 12 wherein the three color channel images are a red color image, a green color image and a blue color image.

14. The electro-optic color imaging system of claim 1 wherein at least one of the color channel images is an infrared color image.

15. The electro-optic color imaging system of claim 1 wherein, for all spatial frequencies below a Nyquist frequency for the detector subsystem, color-specific MTFs for all of the color channels remain above zero.

16. The electro-optic color imaging system of claim 1 wherein, for every spatial frequency below a Nyquist frequency for the detector subsystem, a color-specific MTF for at least one of the color channels remains above zero.

17. The electro-optic color imaging system of claim 1 wherein the optical subsystem comprises a diffractive optical element.

18. The electro-optic color imaging system of claim 1 wherein:
    the at least two different color channels span a wavelength range defined by a minimum wavelength and a maximum wavelength;
    the optical subsystem that has a chromatic depth of focus ratio greater than 5 over the wavelength range; and
    the spectral sensitivity of the detector subsystem is weighted so that a polychromatic MTF remains above zero for all spatial frequencies below a Nyquist frequency for the detector subsystem.

19. The electro-optic color imaging system of claim 18 wherein, for at least one wavelength within the wavelength range, the polychromatic MTF at the at least one wavelength falls below zero at a spatial frequency below the Nyquist frequency.

20. The electro-optic color imaging system of claim 18 wherein the object is a gray-scale object.

21. The electro-optic color imaging system of claim 18 wherein the color channel images are formed on image surfaces that are non-planar.

22. The electro-optic color imaging system of claim 21 wherein the image surfaces are curved due to field curvature.

23. The electro-optic color imaging system of claim 21 wherein, at a given object distance, different wavelengths in the wavelength range are in best focus over different portions of an active area of the detector subsystem.

24. The electro-optic color imaging system of claim 23 wherein the active area comprises detector pixels, each of which has a spectral sensitivity and the spectral sensitivities vary according to which wavelength is in best focus at the location of the detector pixel.

25. The electro-optic color imaging system of claim 23 wherein the active area comprises detector pixels, each of which comprises a color filter and an underlying detector, where the underlying detectors each have a same broadband spectral sensitivity and the spectral sensitivities of the color filters vary according to which wavelength is in best focus at the location of the detector pixel.

* * * * *

UNITED STATES PATENT AND TRADEMARK OFFICE
CERTIFICATE OF CORRECTION

PATENT NO.        : 8,149,319 B2
APPLICATION NO.   : 11/999101
DATED             : April 3, 2012
INVENTOR(S)       : M. Dirk Robinson Page 1 of 1

It is certified that error appears in the above-identified patent and that said Letters Patent is hereby corrected as shown below:

Column 18, line 8, replace "anthe" with -- an --.

Signed and Sealed this
Twenty-eighth Day of August, 2012

David J. Kappos
*Director of the United States Patent and Trademark Office*